P. A. HUDSON.
BELT FASTENER.
APPLICATION FILED MAY 2, 1908.
913,386.
Patented Feb. 23, 1909.
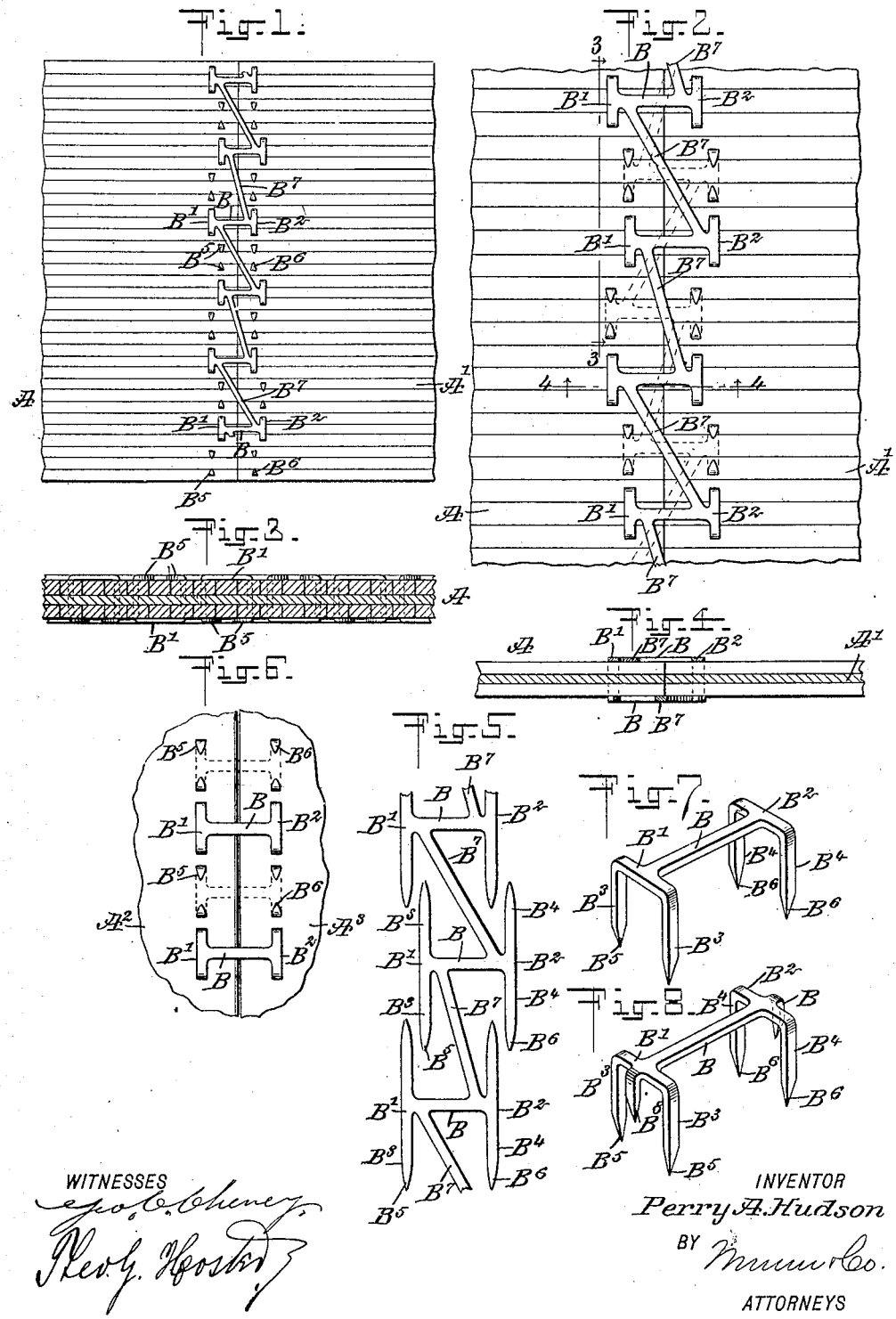
WITNESSES
INVENTOR
Perry A. Hudson
BY
ATTORNEYS

UNITED STATES PATENT OFFICE.

PERRY A. HUDSON, OF NEW YORK, N. Y.

BELT-FASTENER.

No. 913,386.  Specification of Letters Patent.  Patented Feb. 23, 1909.

Application filed May 2, 1908. Serial No. 430,473.

*To all whom it may concern:*

Be it known that I, PERRY A. HUDSON, a citizen of the United States, and a resident of the city of New York, borough of Manhattan, in the county and State of New York, have invented a new and Improved Belt-Fastener, of which the following is a full, clear, and exact description.

The object of the invention is to provide a new and improved belt fastener, more especially designed for fastening the ends of laminated leather belts, fabric belts and other belts securely together and without danger of unduly weakening the laminations or the weave.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a plan view of the improvement as applied to a laminated leather belt and showing the fastener in the form of a plate or connected single fasteners; Fig. 2 is an enlarged plan view of the same; Fig. 3 is a longitudinal section of the same on the line 3—3 of Fig. 2; Fig. 4 is a cross section of the same on the line 4—4 of Fig. 2; Fig. 5 is a plan view of the blank forming the connected staple fasteners; Fig. 6 is a plan view of the improvement as applied to a belt and in the form of a plurality of single separate fasteners; Fig. 7 is a perspective view of a single fastener; and Fig. 8 is a perspective view of a modified form of the same.

In fastening together the ends of belts having longitudinally - extending laminations, as heretofore practiced, the laminations were punched for the passage of the pins or prongs of the belt fasteners, and in doing so the laminations were cut in two, and hence the end portions of the cut laminations offered little, if any, resistance to the fasteners and the connected belt ends necessarily came apart in a short time. In fasteners used on woven fabric belts, the warp is usually cut on applying the fastener and hence the belt is weakened unduly, and the longitudinal strain exerted when the belt is in use tends to pull out the weft. My improved belt fastener can be freely used on laminated or woven belts, especially as the fastener tends to strengthen the belt in a transverse direction.

The ends A, A' of the belt shown in Figs. 1, 2, 3 and 4, are fastened together by a plurality of connected belt fasteners, but the ends $A^2$, $A^3$ of a belt may be fastened together by single fasteners as shown in Fig. 6, it being understood that in either case the belt fastener consists essentially of a longitudinally-extending bar B terminating at its ends in integral cross bars $B'$, $B^2$, from which depend side arms $B^3$, $B^4$, flat in a longitudinal direction and preferably terminating in points $B^5$, $B^6$, respectively. A plurality of such single fasteners may be integrally connected with each other by diagonal bars $B^7$ integrally connected with the longitudinal bar B of one single fastener, near one cross bar $B^2$, and with the longitudinal bar B of the next adjacent single fastener at the other cross bar $B'$, as plainly indicated in Figs. 1 and 2. In the connected fasteners shown, the cross bars $B'$, $B^2$ of one single fastener are out of transverse alinement or staggered relatively to the cross bars $B'$, $B^2$ of the next adjacent single fastener, as plainly indicated in Figs. 1 and 2.

By arranging the belt fastener in the manner described, it can be readily produced from a single blank, as shown in Fig. 5, without unduly wasting a large amount of stock from which the blank is cut. If desired, each single fastener may be provided at each cross bar $B'$, $B^2$ with a downwardly-extending short prong $B^8$, approximately parallel with the corresponding side arms $B^3$, $B^4$.

Now in using the belt fastener, the side arms $B^3$ and $B^4$ are driven through the laminations of the belt, as plainly indicated in Figs. 1 and 2, and then the pointed ends are bent in a transverse direction and clenched on the corresponding face of the belt. The cross bars $B'$, $B^2$ are preferably of such length that the side arms $B^3$, $B^4$ engage the laminations at the middle thereof with a non-pierced lamination between the two engaged by the side arms, as plainly indicated in Figs. 1 and 2, so that the laminations are drawn towards each other in a transverse direction, and consequently the laminated belt is strengthened instead of weakened, and at the same time the two ends A, A' of the belt are securely fastened together.

By reference to Figs. 1 and 2, it will be seen that connected fasteners may be used on both faces of the belt, to insure a firm uniting of the belt ends A, A', at the same time strengthening or reinforcing the belt ends in a transverse direction. The single fasteners may also be used alternately on opposite sides of the belt ends A², A³, as plainly indicated in Fig. 6.

In case the fasteners are used with the auxiliary prongs B⁸, then the side arms B³, B⁴ engage the first and third laminations, while the prongs B⁸ engage the intervening or second lamination, the prongs being preferably of a length corresponding to the thickness of the belt.

Having thus described my invention, I claim as new and desire to secure by Letters Patent:

1. The combination with a laminated or fabric belt, of a fastener, comprising a longitudinal bar extending lengthwise of the belt and over the joint thereof, cross bars integral with the ends of the longitudinal bar and projecting from each side thereof, and side arms extending integrally and angularly from the ends of each cross bar, the side arms being flat in a longitudinal direction and having pointed ends, said arms being passed through the belt and bent in a transverse direction upon the other face of the belt, whereby injury to the laminations or warps of the belt is prevented and the belt strengthened in a transverse direction.

2. A belt fastener comprising pairs of staples, longitudinal bars integrally connecting the staples of a pair of staples with each other, and a bar integrally connected with successive longitudinal bars.

3. A belt fastener, comprising pairs of staples, longitudinal bars integrally connecting the staples of a pair of staples with each other, and a diagonal bar integrally connected with successive longitudinal bars.

4. A belt fastener, comprising pairs of staples, longitudinal bars integrally connecting the staples of a pair of staples with each other, and a diagonal bar integrally connected with successive longitudinal bars, successive staples at one side of the belt fastener being staggered.

5. The combination with a laminated or fabric belt, of fasteners for securing the ends of the belt together, the fasteners each comprising a longitudinal bar, cross bars at the ends of the longitudinal bar and projecting from each side thereof, and side arms extending angularly from the ends of the cross bars, the fasteners being arranged alternately on opposite sides of the belt with their longitudinal bars extending lengthwise of the belt over the joint thereof and the side arms extending through the belt and bent in transverse directions upon the faces of the belt.

In testimony whereof I have signed my name to this specification in the presence of two subscribing witnesses.

PERRY A. HUDSON.

Witnesses:
THEO. G. HOSTER,
JOHN P. DAVIS.